United States Patent [19]

Dwyer

[11] 4,049,465

[45] Sept. 20, 1977

[54] CONCRETE ADDITIVE AND METHOD OF APPLYING STUCCO CEMENT

[76] Inventor: Richard E. Dwyer, 173 Adams St., Dedham, Mass. 02026

[21] Appl. No.: 673,474

[22] Filed: Apr. 5, 1976

[51] Int. Cl.$^2$ ............... C04B 7/351; C04B 13/26
[52] U.S. Cl. .................................................. 106/314
[58] Field of Search ............... 106/87, 90, 91, 314, 106/315

[56] References Cited

U.S. PATENT DOCUMENTS

| | | | |
|---|---|---|---|
| 1,424,908 | 8/1922 | Isaacs | 106/91 |
| 2,163,207 | 6/1939 | Missotten | 106/87 |
| 2,239,925 | 4/1941 | McKee et al. | 106/87 |

Primary Examiner—J. Poer

[57] ABSTRACT

A composition of lime-nitrogen and protein which when mixed together with portland cement improves the final cement products for use in construction whereby, concrete provides greater insulation, improved workability, lighter weight, high early strength, increased compressive strength, and improved finish, and when used as a stucco over plywood, which has been treated with a sealer material such as contact cement produces a superior flame retardent stucco finish of minimal thickness.

6 Claims, No Drawings

CONCRETE ADDITIVE AND METHOD OF APPLYING STUCCO CEMENT

This invention relates to cement additives and more particularly to a material when mixed together can be used as an additive for use with concrete or other cement products to improve their physical properties.

Additives have been prepared and are available in the market for addition to concrete or cement, which are designed primarily to change their characteristics. However, the present additive increases the thermal insulating value of the concrete, its early strength, its compressive strength, workability and finish to an extent heretofore unobtained in the prior art.

Stucco cement is normally applied to a grid or metal lats which must be applied in several stages in order to first seal the grid and apply a finish stucco over it. However, with the present invention an additive is first produced which improves the quality of the stucco then treated plywood used in the construction of houses or other buildings is coated with the stucco and a very excellent strong flame retardent stucco surface is produced. Great economy is achieved in improved construction element which will find wide application.

Mortar cement contains in addition to sand and portland cement, lime-putty or prehydrated lime. The lime is added in various proportions which improves the workability of the cement mix, however, the lime weakens the cement. With the present invention, a very strong mortar cement is produced without the addition of additional lime.

Therefore an object of the present invention is to provide an additive for cement and/or cement products to improve their physical characteristics.

Another object of the present invention is to provide a cement additive having components which restrain their chemical action until added to cement.

Another object of the present invention is to provide a material for addition to concrete which improves its thermal insulating characteristics for construction purposes without structual strength being diminished.

Another object of the present invention is to provide a material which when applied to sealed plywood produces a sturdy, flame resistent, light weight, insulating stucco coating of minimal thickness.

Another object of the present invention is to convert standard cement mix to mortar cement by the addition of lime-nitrogen-protein additive.

Lime nitrogen, or sometimes called calcium cyanamide or chemically ($CaCN_2$) is a well known substance, however, it decomposes in water liberating ammonia. Another element in the composition of the present invention is protein. The preferred protein, is animal protein, however, vegetable protein such as zein of corn has been used effectively. The results differed with vegetable protein in that it took the concrete longer to set. Animal protein, particularly that which is found in the form of animal glue or gelatin is the most desirable. When the protein is mixed with the lime nitrogen in a dry form then mixed with water, the lime nitrogen does not break down and release the ammonia as it would without the presence of the protein. The protein yields an amino acid upon hydrolysis, that is, mixed with water. The protein in the presence of lime nitrogen will not produce an amino acid to form and remains basic. When mixed with the concrete the lime nitrogen breaks down and allows an amino acid to form and react with calcareous and argillaceous content of the portland cement when in a wet state. Accordingly, the additive can be mixed dry and remain dry and with portland cement dry which ultimately can be mixed with sand, water and gravel and at that time the dry additive will enter into its chemical reaction trapping air bubbles producing a very light weight, easily worked, concrete that has a greater mixture of lime nitrogen and protein (whether an animal or vegetable protein) will lend themselves to mixing with water which can be the physical characteristics of the ultimate cement product.

Manufacturers of cement block and concrete brick can also use this material at the factory in its dry state or introduce it into the water prior to its mixing with the dryer products in the fabrication of their end product to improve their characteristics.

EXAMPLE 1

Eight ounces of lime nitrogen and 21 ounces of animal glue or gelatin were mixed together in a dry state (ratio by volume 4 parts animal glue to 1 part calcium cyanamide). The mixture was added to water in such proportion that the combined mixture weighs 8 pounds and 1 ounce. One gallon of water weighing approximately 8.33 pounds.

This material was then mixed with a sample of cement or concrete, that is: the standard 1: 2: 4 mixture of cement, sand and aggregate by volume respectively, with a given amount of water to produce the desired slump. Test samples that have been prepared indicated a "K" factor of 3.68 for 1 inch of thickness in the finished state. The concrete troweled very easily and a high glased finish was produced on the outer surface. The concrete compared to other controlled samples having a 100% improvement in workability, a 75% greater insulating value and was 25% lighter for a given volume and the early strength of the material was considerably greater. The test samples also indicated that the concrete with the additive retained air forming a cell structure.

EXAMPLE 2

Additional samples were tested with the animal glue doubled over that in Example 1. The end product indicated that the gelatin peptized and a jelly formed, presenting a product which appeared undesirable although the physical characteristics were not significantly deteriorated. Workability of the product was not as good as that of Example 1.

EXAMPLE 3

The lime nitrogen was doubled over that in Example 1 while the animal glue remained the same. Ammonium hydroxide formed and as a result it obstructed the normal hydration of the concrete. The ammonium hydroxide made the preferred solution of Example 1 unstable.

The product made in accordance with Example 1, was added to a stucco mixture. The stucco mixture was then applied to plywood used in construction. The structure produced did not set as well as desired and a second plywood was treated in such a way that the plywood was sealed. It was discovered that contact cement applied to construction plywood sealed and improved the bond considerably. The stucco was then applied to the treated plywood and a firm stucco resulted. The stucco can be varied in thickness, however, an optimum thickness of approximately ¼ of an inch provided a very firm stucco which had a very pleasant appearance and which prevented flame from igniting the plywood underneath. The flame retarding qualities of the stucco is much greater than any paint or other treated surface that could be compared with it. Accordingly, a structual material evolved which could be used in the construction of homes, particularly garages which would prevent fire from spreading from one location to another, and at the same time presenting a much stronger better insulating material than normal stucco and avoid the requirement for metal grill works and enhances that overall structure well beyond that which is presently available.

EXAMPLE 4

A mixture in accordance with Example 1 was produced without adding water. The dry mixture was then added to portland cement which was then mixed in the usual manner to produce concrete. The concrete exhibited the same characteristics as those in Example 1. It was concluded that the additive could be utilized in both a liquid or dry form. The liquid being preferable for small batch concrete applications.

The foregoing examples are by way of illustration. Those skilled in the art may make many variations and substitutions without departing from the true scope and spirit of my invention. I wish therefore to be limited only by the appended claims:

I claim:

1. A concrete additive comprising, by dry volume approximately,
   four parts protein, and
   one part calcium cyanamide.
2. A concrete additive according to claim 1 wherein said protein is animal protein.
3. A concrete additive according to claim 2 wherein said protein is vegetable protein.
4. A concrete additive according to claim 2 wherein said animal protein is animal glue.
5. A concrete additive according to claim 3 wherein said vegetable protein is zeins of corn.
6. A cement additive according to claim 5 which further includes sufficient water by weight so that said mixture will weigh a discrete multiple of approximately 8 pounds, 1 ounce wherein water weighs 8.33 lbs. per gallon.

* * * * *